United States Patent
Seo et al.

(10) Patent No.: US 10,211,974 B2
(45) Date of Patent: Feb. 19, 2019

(54) ENCRYPTION APPARATUS, METHOD FOR ENCRYPTION AND COMPUTER-READABLE RECORDING MEDIUM

(71) Applicants: SAMSUNG ELECTRONICS CO., LTD., Suwon-si, Gyeonggi-do (KR); SEOUL NATIONAL UNIVERSITY R&DB FOUNDATION, Seoul (KR)

(72) Inventors: Jae Woo Seo, Suwon-si (KR); Jung Hee Cheon, Seoul (KR); Yong Ho Hwang, Seoul (KR); Jinsu Kim, Seoul (KR)

(73) Assignees: SAMSUNG ELECTRONICS CO., LTD, Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 199 days.

(21) Appl. No.: 14/693,256

(22) Filed: Apr. 22, 2015

(65) Prior Publication Data
US 2015/0312031 A1 Oct. 29, 2015

(30) Foreign Application Priority Data
Apr. 23, 2014 (KR) .................. 10-2014-0048871

(51) Int. Cl.
*H04L 9/00* (2006.01)
*H04L 9/30* (2006.01)

(52) U.S. Cl.
CPC .............. *H04L 9/008* (2013.01); *H04L 9/30* (2013.01)

(58) Field of Classification Search
CPC .................. H04L 9/008; H04L 9/30–9/3093
See application file for complete search history.

(56) References Cited

U.S. PATENT DOCUMENTS

| | | | |
|---|---|---|---|
| 8,515,058 B1* | 8/2013 | Gentry | H04L 9/008 380/28 |
| 9,436,835 B1* | 9/2016 | Saldamli | G06F 21/602 |
| 2007/0053506 A1* | 3/2007 | Takashima | G06F 7/725 380/28 |
| 2011/0145570 A1* | 6/2011 | Gressel | H04L 63/0421 713/159 |
| 2013/0166456 A1* | 6/2013 | Zhang | G06Q 20/38215 705/67 |
| 2013/0170640 A1 | 7/2013 | Gentry | |
| 2013/0216044 A1* | 8/2013 | Gentry | H04L 9/008 380/277 |
| 2014/0177828 A1* | 6/2014 | Loftus | H04L 9/008 380/44 |
| 2014/0185797 A1* | 7/2014 | Yasuda | H04L 9/008 380/44 |

(Continued)

OTHER PUBLICATIONS

Rivest, Shamir, and Adleman, "A Method for Obtaining Digital Signatures and Public-Key Cryptosystems", Pub. Date: 1978, pp. 120-126.*

(Continued)

*Primary Examiner* — Kevin Bechtel
(74) *Attorney, Agent, or Firm* — Staas & Halsey LLP

(57) ABSTRACT

An encryption apparatus includes a setting generator configured to generate a public key and a secret key necessary for encryption; and an encryptor configured to generate a homomorphic ciphertext which allows multiplication operation by using the generated public key and a plaintext.

9 Claims, 9 Drawing Sheets

(56) References Cited

U.S. PATENT DOCUMENTS

| | | | | |
|---|---|---|---|---|
| 2015/0143511 A1* | 5/2015 | Vujic | ..................... | G06F 21/32 |
| | | | | 726/19 |
| 2015/0227930 A1* | 8/2015 | Quigley | ............. | G06Q 20/4012 |
| | | | | 705/72 |
| 2015/0312028 A1* | 10/2015 | Cheon | .................... | H04L 9/008 |
| | | | | 713/189 |

OTHER PUBLICATIONS

Brakerski et al., "Efficient Fully Homomorphic Encryption from (Standard) LWE" Pub. Date: 2011, pp. 97-106.*
Cheon et al., "A Hybrid Scheme of Public-Key Encryption and Somewhat Homomorphic Encryption" Pub. Date: May 2015, pp. 1052-1063.*
Menezes et al., Handbook of Applied Cryptography, 1996.
Gentry et al., "Homomorphic Evaluation of the AES Circuit" Aug. 22, 2012.
Craig Gentry, "Fully Homomorphic Encryption Using Ideal Lattices" STOC 2009: Proceedings of the forty-first annual ACM symposium on Theory of computing, pp. 169-178.

* cited by examiner

FIG. 4

- $p_1 = 2q_1 + 1$
- $p_2 = 4q_2 + 1$
- $N = p_1 p_2$
- g IS GENERATOR OF $J_N$ WHOSE ORDER IS $\frac{\Phi(N)}{2}$
- $y = g^e \bmod N$
- $\sigma \in \{\tau \in \mathbb{Z}_N^\times | (\frac{a}{N}) = 1\}$
- $r \in [0, N)]$
- $h \in [0, N^2)$

FIG. 8

| Security level | HOMOMORPHIC CIPHERTEXT | EGM (EXEMPLARY EMBODIMENT) |
|---|---|---|
| 42 | 237 KB | 60 Byte |
| 52 | 1.2 MB | 165 Byte |
| 62 | 1.5 MB | 258 Byte |
| 72 | 8.7 MB | 380 Byte |

ENCRYPTION APPARATUS, METHOD FOR ENCRYPTION AND COMPUTER-READABLE RECORDING MEDIUM

CROSS-REFERENCE TO RELATED APPLICATIONS

This application claims priority benefit from Korean Patent Application No. 10-2014-0048871, filed on Apr. 23, 2014, in the Korean Intellectual Property Office, the disclosure of which is incorporated herein by reference in its entirety.

BACKGROUND

1. Field

One or more embodiments relate to an encryption apparatus, a method for encryption, a computer-readable recording medium, more particularly, to an encryption apparatus capable of performing homomorphic encryption on a ciphertext which is encrypted by using a public key method, a method for encryption, a computer-readable recording medium.

2. Description of the Related Art

Since the quantity of data processed by individuals and corporations increases, data needs to be efficiently managed. Accordingly, recently the number of cases goes up where information is stored by utilizing external database service.

Meanwhile, in case where sensitive information such as personal information, etc. is stored in an external device, a problem such as data spill, etc. could occur, which requires data to be encrypted to be stored.

When data is encrypted to be stored as described above, security on the stored data is guaranteed. A database provides an application environment in which data are searched and utilized, in addition to data storing. However, encrypted data prohibits the database server from obtaining any information, and thus such application service is prohibited for encrypted data, from the beginning.

The most widely known scheme among the homomorphic encryption is fully homomorphic encryption (FHE). According to FHE, only a single bit can have a plaintext and supports addition and multiplication between ciphertexts. The FHE is a scheme in which somewhat homomorphic encryption which supports a limited number of addition and multiplication is designed first and then a new ciphertext whose noise has been reduced is reduced by using squashing and bootstrapping.

However, because a ciphertext of the conventional FHE is too large in size, there has been a disadvantage that the ciphertext cannot be used in a mobile terminal. For instance, the smallest size of a ciphertext among the FHE algorithm which has been proposed is 460 kB, which is Ring LWE-based encryption. The Ring LWE-based encryption is 100 times as large as the size of the encryption according to the existing encryption system (ElGamal, Paillier, RSA, AEX).

Accordingly, recently, a hybrid encryption scheme which uses a method of combining the existing encryption system with FHE which supports operations between encryptions has been proposed.

The hybrid encryption scheme transmits/stores common ciphertext having relatively very small size, and thus the hybrid encryption scheme is efficient in terms of space (bandwidth, memory). Until now, only hybrid encryption scheme which combines a symmetric-key cryptosystem such as the Advanced Encryption Standard (AES) with FHE has been suggested. However, the AES can be applied only to personal DB, which results in disadvantage in terms of applicability.

SUMMARY

Additional aspects and/or advantages will be set forth in part in the description which follows and, in part, will be apparent from the description, or may be learned by practice of the invention.

The foregoing described problems may be overcome and/or other aspects may be achieved by one or more embodiments of an encryption apparatus capable of performing homomorphic encryption on a ciphertext encrypted according to a public key method, a method for encryption and computer-readable recording medium.

An encryption apparatus according to one or more embodiments may include a setting generator configured to generate a public key and a secret key necessary for encryption; and an encryptor configured to generate a ciphertext which may allow multiplication operation by using the generated public key and a plaintext.

In this case, the encryptor may include: a first encryptor configured to perform a function on the plaintext to be in a message space which may allow addition and multiplication operations; and a second encryptor configured to generate a ciphertext from the plaintext, on which a function may be performed, by using the public key.

In this case, the first encryptor may perform a function on a plaintext by using a one-to-one function, such as the function below, for example.

$$\iota(m) = (\hat{m}, \check{m}) = \left(m\left(\frac{m}{N}\right), \left(1 - \left(\frac{m}{N}\right)\right)/2\right)$$

Here, N is $p_1 p_2$, $p_1 = 2q_1 + 1$, $p_2 = 4q_2 + 1$, $q_1$, and $q_2$ are prime numbers, m is a plaintext data, and $$\left(\frac{m}{N}\right)$$

is a Jacobi symbol.

Meanwhile, the second encryptor may generate a ciphertext from the plaintext on which a function is performed, such as by using an Equation below, for example:

$$c = (c_1, c_2, c_3) = (g^{-r}, \hat{m}y^r, \sigma^{\check{m}} h^2)$$

Here, g is an element of $$J_N = \left\{ a \in Z_N^* \mid \left(\frac{a}{N}\right) = 1 \right\}$$

whose order is $\phi(N)/2$, y is a value defined to be $y = g^e \mod N$ with respect to a randomly selected $e \in [0, 4q_1 q_2)$, e is a secret key, and r and h are randomly selected values respectively from $Z_N^2$ and $Z_N$.

The setting generator may generate a plurality of parameters corresponding to a user and generate a public key and a secret key corresponding to the generated parameter.

The apparatus may further include: a storage configured to store the generated ciphertext.

The apparatus may further include: an operator configured to perform at least one operation of addition and multiplication operations on the stored ciphertext.

The apparatus may further include: a decryptor configured to perform decryption on the ciphertext on which the above operation is performed.

The foregoing described problems may be overcome and/or other aspects may be achieved by one or more embodiments of an encryption method which may include: generating a public key and a secret key necessary for encryption, and generating a ciphertext which may allow addition and multiplication operation.

The generating the ciphertext may further include: performing a function on the plaintext to be in a message space which may allow addition and multiplication; and generating a ciphertext from the plaintext on which a function may be performed by using the public key.

The performing a function may include performing a function on a plaintext by using one-to-one function below:

$$\iota(m) = (\hat{m}, \check{m}) = \left(m\left(\frac{m}{N}\right), \left(1 - \left(\frac{m}{N}\right)\right)/2\right)$$

Here, N is $p_1 p_2$, $p_1 = 2q_1 + 1$, $p_2 = 4q_2 + 1$, $q_1$, and $q_2$ are prime numbers, m is a plaintext data, and $$\left(\frac{m}{N}\right)$$

is a Jacobi symbol.

In this case, the generating the ciphertext may include generating a ciphertext from the plaintext on which a function is performed by using an Equation below:

$$c = (c_1, c_2, c_3) = (g^{-r}, \hat{m} y^r, \sigma^{\check{m}} h^2)$$

Here, g is an element of $$J_N = \left\{ a \in Z_N^* \middle| \left(\frac{a}{N}\right) = 1 \right\}$$

whose order is $$\frac{\phi(N)}{2},$$

y is a value defined to be $y = g^e \mod N$ with respect to a randomly selected $e \in [0, 4q_1 q_2)$, e is a secret key, and r and h are randomly selected values respectively from $Z_N^2$ and $Z_N$.

The generating the public key and the secret key may include generating a plurality of parameters corresponding to a user; and generating a public key and a secret key corresponding to the generated parameter.

The method may further include storing the generated ciphertext.

The method may further include performing at least one operation of addition and multiplication operations on the stored ciphertext.

The method may further include performing decryption on the ciphertext on which the above operation is performed.

The foregoing described problems may be overcome and/or other aspects may be achieved by one or more embodiments of a non-transitory computer readable recording medium which includes a program for realizing an encryption method, wherein the encryption method may include: generating a public key and a secret key necessary for encryption; and generating a ciphertext which may allow multiplication operation by using the generated public key and a plaintext.

BRIEF DESCRIPTION OF THE DRAWINGS

These and/or other aspects will become apparent and more readily appreciated from the following description of embodiments taken in conjunction with the accompanying drawings in which:

FIG. 4 is a view illustrating a definition of terms used for encryption operation and a definition of a parameter, according to one or more embodiments, FIG. 8 is a view provided to compare a conventional ciphertext size and a ciphertext size according to one or more embodiments.

DETAILED DESCRIPTION

Figure 1:
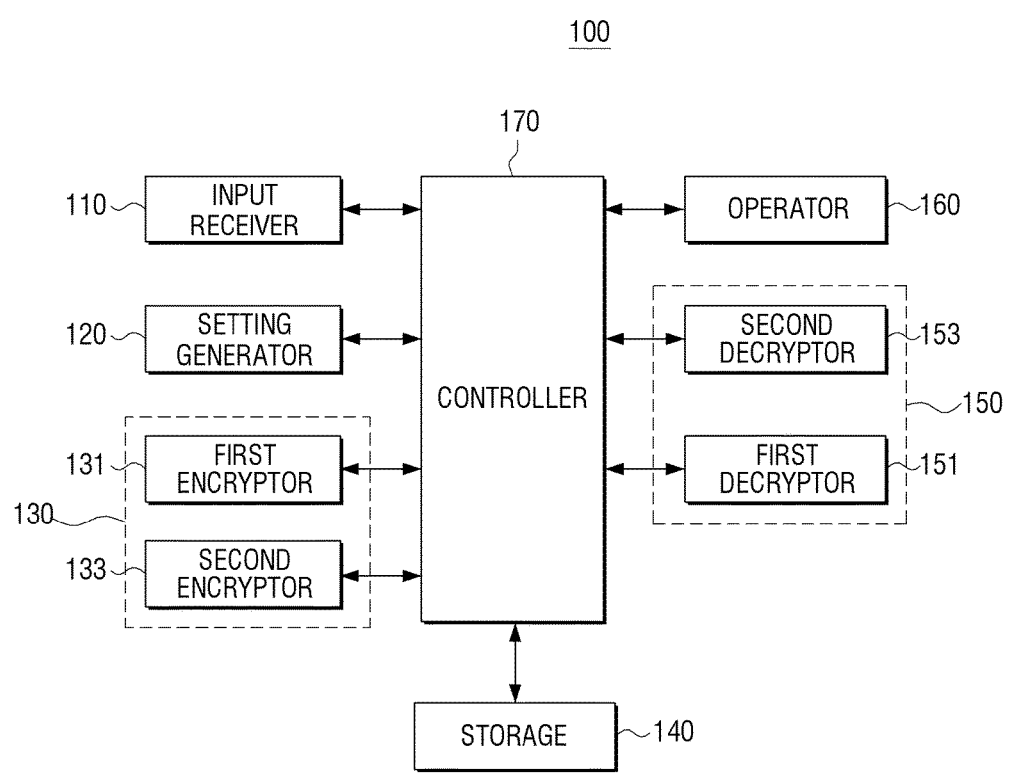
FIG. 1 is a view illustrating a structure of a data management device according to one or more embodiments.

Reference will now be made in detail to the embodiments, examples of which are illustrated in the accompanying drawings, wherein like reference numerals refer to the like elements throughout. The embodiments are described below to explain the present invention by referring to the figures.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view illustrating a structure of the data management device according to one or more embodiments.

Referring to FIG. 1, the data management device 100 may include an input receiver 110, a setting generator 120, an encryptor 130, a storage 140, a decryptor 150, an operator 160, and a controller 170.

The input receiver 110 may be configured to be connected to an external device. The input receiver 110 may be connected to an external device not just through wired connection method (USB, PS/2, etc), a local area network (LAN) and Internet network but also through a wireless communication method (e.g., WiFi, bluetooth, GSM, UMTS, LTE, WiBRO, etc.).

The input receiver 110 may receive as input a system parameter. Here, the system parameter is a parameter value which may be used to generate a public key and a secret key or which may be applied to encryption algorithm that will be explained below. Meanwhile, according to one or more embodiments, a system parameter may be received from an external device. However, according to one or more embodiments, the data management device 100 may generate its own system parameter.

The input receiver 100 may receive as input a plaintext (or data). Here, the plaintext is data which should be encrypted and may be, for example, personal information such as the personal identification number, yearly salary, age, etc. At this time, the data management device 100 may encrypt its own plaintext. Alternatively, according to one or more embodiments, an external device may perform encryption. In this case, the input receiver 110 may receive as input an encrypted plaintext, i.e., a ciphertext, from an external device.

The input receiver 110 may receive as input an operation command on the ciphertext. Specifically, the input receiver 110 may receive as input an operation command for operation for a stored database which may be received from an external device or stored by the user (e.g., addition, multiplication, average).

The setting generator 120 may generate a public key and a secret key. Specifically, the setting generator 120 may generate a public key (pk) and a secret key (sk) by using a system parameter received from the input receiver 110.

The encryptor 130 may perform multiplicative homomorphic encryption on a plaintext by using a public key. Detailed configuration and operation of the input receiver 130 will be explained below with reference to FIG. 3. Here, multiplicative homomorphic encryption refers to an encryption scheme which satisfies the following Equation, when ciphers of $m_1$ and $m_2$ are $c_1$ and $c_2$. A generated ciphertext may be decrypted by a secret key which may be different from a public key.

$$Enc(m_1) \times Enc(m_2) = Enc(m_1 \times m_2) \qquad \text{[Equation 1]}$$

The storage 140 may store a generated ciphertext. Here, the storage 140 may store a plurality of ciphertexts. The storage 140 may store a ciphertext which may be operated upon by the operator (160) which will be explained below.

Such storage 140 may be realized as a storage medium in the data management device 100 or an external device, e.g., a removable disk including USB memory, and the like, a storage medium connected to a separate host, and a web server through a network.

The decryptor 150 may decrypt a ciphertext. Specifically, the decryptor 150 may decrypt the ciphertext using the secret key (sk) generated by the setting generator 120. Detailed configuration and operation of the decryptor 150 will be explained with reference to FIG. 5.

The operator 160 may perform at least one operation of addition and multiplication operations with respect to a ciphertext. Specifically, the operator 160 may have a plurality of operators (e.g., addition operator, multiplication operator, etc.) and may perform an operation with respect to the ciphertext using an operator which corresponds to the received operation command.

The controller 170 may control each configuration in the data management device 100. Specifically, when a plaintext is received as input from the input receiver 100, the controller 170 may control the encryptor 130, such that a homomorphic cipher of the plaintext may be generated. When an operation command on the generated ciphertext is generated, the controller 170 may control the operator 160, such that operation on the generated ciphertext may be performed.

When a decryption command on the generated ciphertext or the operated ciphertext is received, the controller 170 may control the decryptor 150, such that the generated ciphertext or the ciphertext which may be operated on by the operator (160) may be decrypted.

The data management device 100 according to one or more embodiments may generate a ciphertext which may be far smaller in size, compared with a conventional ciphertext according to the FHE. Since it may be possible to generate a ciphertext which may be small in size as described above, the ciphertext according to the exemplary embodiment may be applied to a safe cloud computing environment in which service may be provided anywhere through a terminal such as a smartphone.

In FIG. 1, the data management device 100 may perform all operations: encryption operation, ciphertext-storing operation, decryption operation. However, according to one or more embodiments, an encryption apparatus may be composed of an input receiver, an setting generator and an encryptor only, and a decryption apparatus may be composed of a decryptor only, and a cloud server as described in FIG. 7 may be composed of a storage and an operator only.

Hereinafter, the setting generator 120, the encryptor 130 and decryptor 150 which may use a public key encryption system, such that a message space may become a ring ($Z_n^*$) by combining ElGamal encryption Goldwasser-Micli cipher will be explained with reference to FIGS. 2 to 8.

Figure 2:
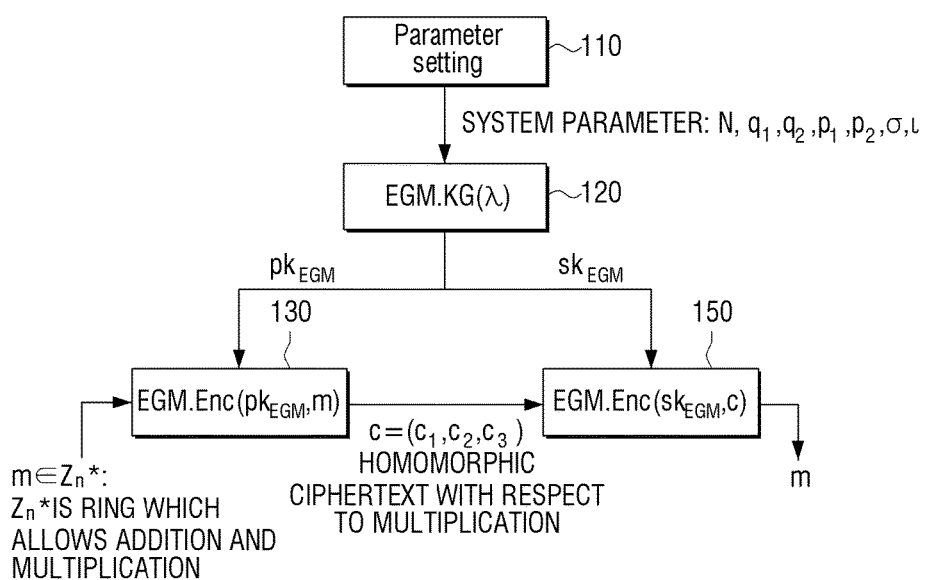
FIG. 2 is a view provided to explain a homomorphic encryption method according to one or more embodiments.

FIG. 2 is a view provided to explain the homomorphic encryption method according to one or more embodiments.

Referring to FIG. 2, the input receiver 110 defines and may output system parameters (N, $p_1$, $p_2$, $q_1$, $q_2$, $\zeta$, $\iota$). Such input receiver 110 may be realized as an algorithm which may operate and output the above-described system parameters. Here, $\iota$ is a bijective map, and is Equation 2 which may perform a function on a plaintext to be in a message space which may be a ring.

The setting generator 120 may generate a public key ($pk_{EGM}$=(N, G, Y, $\zeta$)) and a secret key ($sk_{EGM}$=(e, $p_2$)) by using system parameters defined above. However, according to one or more embodiments, the setting generator 120 may generate the above-described public key and secret key.

The encryptor 130 may perform multiplicative homomorphic encryption on a plain text by using a public key generated by the setting generator 120, $pk_{EGM}$=(N, G, Y, $\zeta$). The encryptor 130 may perform a function on a plaintext such that message space becomes a ring and may perform multiplicative homomorphic encryption on a message on which a function is to be performed. Thus, the encryptor 130 may output a ciphertext on which multiplication may be performed (that is, multiplicative homomorphic ciphertext) (c=($c_1$, $c_2$, $c_3$)).

The decryptor 150 may receive as input a ciphertext (c=($c_1$, $c_2$, $c_3$)) and a secret key ($sk_{EGM}$=(e, $p_2$)). The decryptor 150 may decrypt the ciphertext (c=($c_1$, $c_2$, $c_3$)) using the secret key ($sk_{EGM}$=(e, $p_2$)) which may be generated by the above-described setting generator 120.

Figure 3:
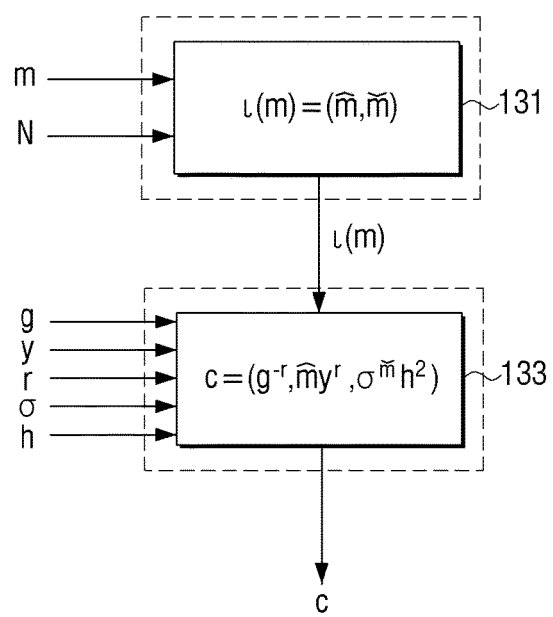
FIG. 3 is a view illustrating an operation of an encryptor according to one or more embodiments, such as the encryptor of FIG. 1.

FIG. 3 is a view provided to explain an operation of the encryptor according to one or more embodiments, such as the encryptor in FIG. 1.

Referring to FIG. 3, the encryptor 130 may include a first encryptor 131 and a second encryptor 133.

The first encryptor 131 may perform a function on a plaintext to be in message space which may allow adding and multiplication. Specifically, the first encryptor 131 may receive as input a plaintext and a parameter N and may perform a function on the plaintext based on Equation 2.

$$\iota(m) = (\hat{m}, \check{m}) = \left(m\left(\frac{m}{N}\right), \left(1 - \left(\frac{m}{N}\right)\right)/2\right) \quad \text{[Equation 2]}$$

Here, N is $p_1p_2$, $p_1=2q_1+1$, $p_2=4q_2+1$, $q_1$ and $q_2$ are prime numbers, m is a plaintext data, and $$\left(\frac{m}{N}\right),$$

which is a Jacobi symbol, can be calculated to be $$\left(\frac{m}{N}\right) = \left(\frac{m}{p_1 \cdot p_2}\right) = \left(\frac{m}{p_1}\right) \cdot \left(\frac{m}{p_2}\right) = (m^{(p_1-1)/2} \bmod p_1) \cdot (m^{(p_2-1)/2} \bmod p_2).$$

The operation for calculating a Jacobi symbol may differ depending on those who realize a system.

A message on which a function is performed through Equation 1 may become a message which may allow addition and multiplication. Specifically, the above message satisfies Equation 3 below based on the definition of the above-described Equation 2.

$$CRT_{(p_1p_2)}(c_3^{q_1}, c_3^{2q_2}) = \begin{cases} 1, & \check{m} \text{ is even number} \\ -1, & \check{m} \text{ is odd number} \end{cases} \quad \text{[Equation 3]}$$

Multiplication between cyphertexts may be performed with respect to $c_i$=EGM·ENC($pk_{EGM}$,$m_i$), a ciphertext which is encrypted using the above Equation 3 according to an EGM encryption system, which can prove that EGM·Dec ($sk_{EGM}$, $\Pi c_i$)=$\Pi m_i$.

Therefore, in a hybrid scheme which combines an EGM public key encryption with fully homomorphic encryption, $Z_n^*$ which is a message space becomes a ring, addition and multiplication between ciphertexts can be performed. That is, a hybrid system which uses an EGM public key encryption system may become homomorphic with respect to an addition operation and a multiplication operation.

The second encryptor 133 may generate a ciphertext from a plaintext on which a function is performed, by using a public key. Specifically, the second encryptor 133 may output a function value ($\iota(m)$) which may be output from the first encryptor 131 as a ciphertext (c) by using Equation 4 below.

$$c = (c_1, c_2, c_3) = (g^{-r}, \hat{m}y^r, \sigma^{\check{m}}h^2) \quad \text{[Equation 4]}$$

Here, g is an element of $$J_N = \left\{a \in Z_N^* \mid \left(\frac{a}{N}\right) = 1\right\}$$

whose order is $$\frac{\phi(N)}{2},$$

y is a value defined as y=$g^e$ mod N with respect to a randomly selected e∈[0, $4q_1q_2$), e is a secret key, and r and h are randomly selected values respectively from $Z_N^2$ and $Z_N$.

Here, the second encryptor 133 may use {g, y, ζ, r, h} as input values. The values may be received as input through the above-described input receiver 110, and the definition of the input values is described in FIG. 4. Specifically, N is a positive integer, N=$p_1p_2$, which is obtained by multiplying $p_1$=2$q_1$+1 by $p_2$=4$q_2$+1 which are relatively prime. Here $q_1$ and $q_2$ are relatively prime.

Figure 5:
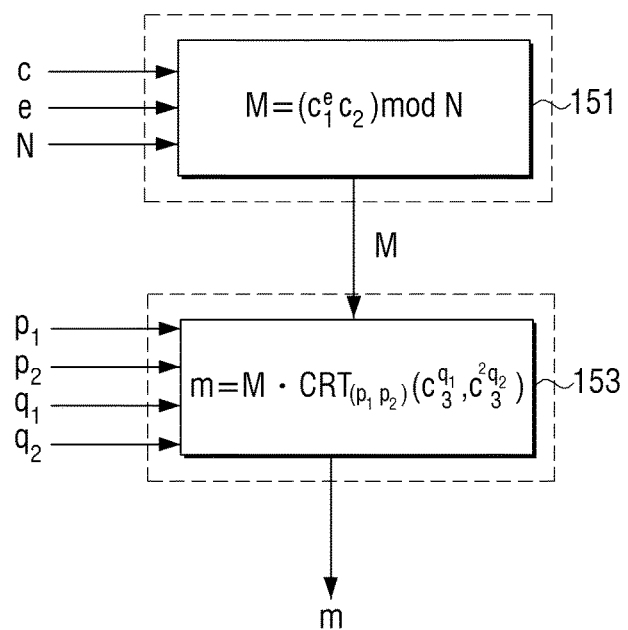
FIG. 5 is a view provided to explain an operation of the decryptor according to one or more embodiments.

FIG. 5 is a view provided to explain operation of the decryptor according to one or more embodiments, such as the decryptor of FIG. 1.

Referring to FIG. 5., the decryptor 150 consists of a first decryptor 151 and a second decryptor 153.

The first decryptor 151 may output M from a ciphertext (c) using Equation 5 below.

$$M = (c_1^e c_2) \bmod N \quad \text{[Equation 5]}$$

Here, $c_1$ and $c_2$ are first and second coordinates of the ciphertext (c) which may be encrypted by the encryption apparatus explained with reference to FIG. 1.

The second decryptor 153 may perform a Chinese Remainder Theorem (CRT) operation on M which is outputted by the first decryptor 151 by using Equation 6 below.

$$m = M \cdot CRT_{(p_1p_2)}(c_3^{q_1}, c_3^{2q_2}) \quad \text{[Equation 6]}$$

Here, $c_3$ is the third coordinate of a ciphertext c which is explained with reference to FIG. 2, and CRT is an operator which applies a CRT, and $q_1$ and $q_2$ are secret keys. Specifically, when CRT is applied, $s_1$, $s_2$, . . . , $s_k$ are integers that are relatively prime numbers, and b=$s_1$ $s_2$ . . . $s_k$, a single value c which satisfies c=$a_i$ mod $s_i$ (1≤i≤k) exists with respect to a random number sequence, $a_1$, $a_2$, . . . , $a_k$.

In Equation 6 $CRT_{(p_1p_2)}$ ($c_3^{q_1}$, $c_3^{2q_2}$), $p_1p_2$ corresponds to a divisor (a number which divides, i.e., $s_i$), and $c_3^{q_1}$, $c_3^{2q_2}$ corresponds to a remainder (I.e., $a_i$). The $CRT_{(p_1p_2)}$ ($c_3^{q_1}$, $c_3^{2q_2}$) can be calculated using Garner's algorithm, etc. Here, an algorithm operating $CRT_{(p_1p_2)}$ ($c_3^{q_1}$, $c_3^{2q_2}$) may be changed when $CRT_{(p_1p_2)}$ ($c_3^{q_1}$, $c_3^{2q_2}$) is realized.

Figure 6:
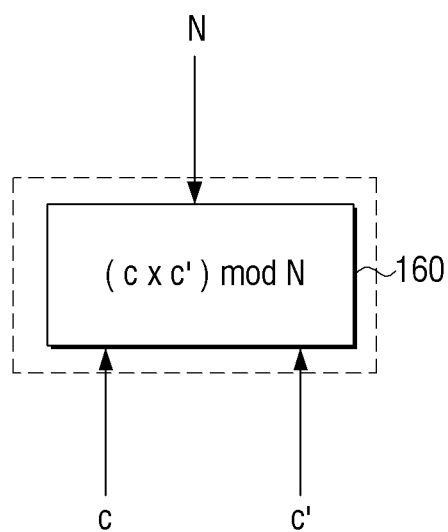
FIG. 6 is a view provided to explain an operation of the operator according to one or more embodiments.

FIG. 6 is a view provided to explain operation of an operator according to one or more embodiments, such as the operator of FIG. 1.

Referring to FIG. 6, the operator 160 may include a multiplication operator. Here, the multiplication operator may be an element which may perform a multiplication operation on ciphertexts c and c' which may be generated by the above-described encryptor 130 based on Equation 7, with respect to m and m', which are different from each other.

$$(cc') \bmod N = (c_1c'_1 \bmod N, c_2c'_2 \bmod N, c_3c'_3 \bmod N) \quad \text{[Equation 7]}$$

Here, a decrypted message $m_{mul}$=m×m' may be obtained by decrypting the operated $c_{mul}$=c×c' mod N by using a secret key, $sk_{EGM}$=(e, q2).

As shown above, a ciphertext based on homomorphic encryption generated according to one or more embodiments may make an encryption system which has even smaller ciphertext size compared with a ciphertext size based on the existing homomorphic encryption system, and thus may be applied to a safe cloud computing environment where service may be provided anytime anywhere through a terminal such as a smartphone, etc.

Specifically, from the perspective of a user terminal, encryption may be performed using EGM cipher, and size of a ciphertext which will be transmitted or stored decreases. In addition, from the perspective of a server, data may be stored in a form of an EGM ciphertext, not an FHE ciphertext, and thus the homomorphic encryption generated according to one or more embodiments has advantage in terms of server operation.

In addition, in case of the existing fully homomorphic encryption, the higher degree a polynomial expression has, the deeper depth the polynomial expression has. Thus, when a high degree polynomial which is encrypted is operated, noise increases and when the size of the high degree polynomial reaches some level, decryption has not been performed appropriately. In order to address the problem, Gentry proposed a bootstrapping scheme where decryption operation with improved complexity can be performed on an encrypted ciphertext, by using a secret key of the ciphertext. By comparison, according to one or more embodiments, operation between ciphertexts can be performed without bootstrapping, even when the degree of a ciphertext is very high. That is because the operation of ciphertexts on which multiplication are performed can be performed, with the ciphertexts still being ElGamal ciphertext, and thus, no matter how high the degree is, there is no need for bootstrapping.

According to result derived from Gentry and Halevi, there has been disadvantage that when $\lambda$ is a security parameter, the number of multiplications that can be supported should increase to $4\lambda$. However, according to the secret evaluation of exponentiation according to one or more embodiments, the number of multiplication may be reduced to $4\lambda/\log w$, and exponent operation (e) may be performed without exposing information on the exponent (e), which is a secret.

According to according to one or more embodiments, homonorphic encryption may be performed using ElGamal scheme (i.e., EGM encryption algorithm). In case of a homomorphic encryption algorithm which can be performed by combining the public key encryption algorithm with a hybrid scheme, a message space should be identical to public key encryption algorithm. A homomorphic algorithm that can be combined under such conditions (the first condition: message space is ring, the second condition: a public-key based, the third condition: multiplicative homomorphic encryption) is as follows. Hereinafter, 11 homomorphic encryption algorithm are described, but as long as the above-described conditions are met, homomorphic encryption algorithm other than the above-described homomorphic algorithm may be used.

1. Marten van Dijk, Craig Gentry, Shai Halevi, Vinod Vaikuntanathan: Fully Homomorphic Encryption over the Integers. EUROCRYPT 2010: 24-43
2. Jean-Sebastien Coron, Avradip Mandal, David Naccache, Mehdi Tibouchi: Fully Homomorphic Encryption over the Integers with Shorter Public Keys. CRYPTO 2011: 487-504
3. Jean-Sebastien Coron, David Naccache, Mehdi Tibouchi: Public Key Compression and Modulus Switching for Fully Homomorphic Encryption over the Integers. EUROCRYPT 2012: 446-464
4. Jung Hee Cheon, Jean-Sebastien Coron, Jinsu Kim, Moon Sung Lee, Tancrede Lepoint, Mehdi Tibouchi, Aaram Yun: Batch Fully Homomorphic Encryption over the Integers. EUROCRYPT 2013: 315-335
5. Zvika Brakerski, Vinod Vaikuntanathan: Efficient Fully Homomorphic Encryption from (Standard) LWE. FOCS 2011: 97-106
6. Zvika Brakerski, Craig Gentry, Shai Halevi: Packed Ciphertexts in LWE-Based Homomorphic Encryption. Public Key Cryptography 2013: 1-13
7. Zvika Brakerski: Fully Homomorphic Encryption without Modulus Switching from Classical GapSVP. CRYPTO 2012: 868-886
8. Zvika Brakerski, Vinod Vaikuntanathan: Fully Homomorphic Encryption from Ring-LWE and Security for Key Dependent Messages. CRYPTO 2011: 505-524
9. Zvika Brakerski, Craig Gentry, Vinod Vaikuntanathan: (Leveled) fully homomorphic encryption without bootstrapping. ITCS 2012: 309-325
10. Adriana Lopez-Alt, Eran Tromer, Vinod Vaikuntanathan: On-the-fly multiparty computation on the cloud via multikey fully homomorphic encryption. STOC 2012: 1219-1234
11. Joppe W. Bos, Kristin Lauter, Jake Loftus, Michael Naehrig: Improved Security for a Ring-Based Fully Homomorphic Encryption Scheme. IACR Cryptology ePrint Archive 2013: 75 (2013)

Figure 7:
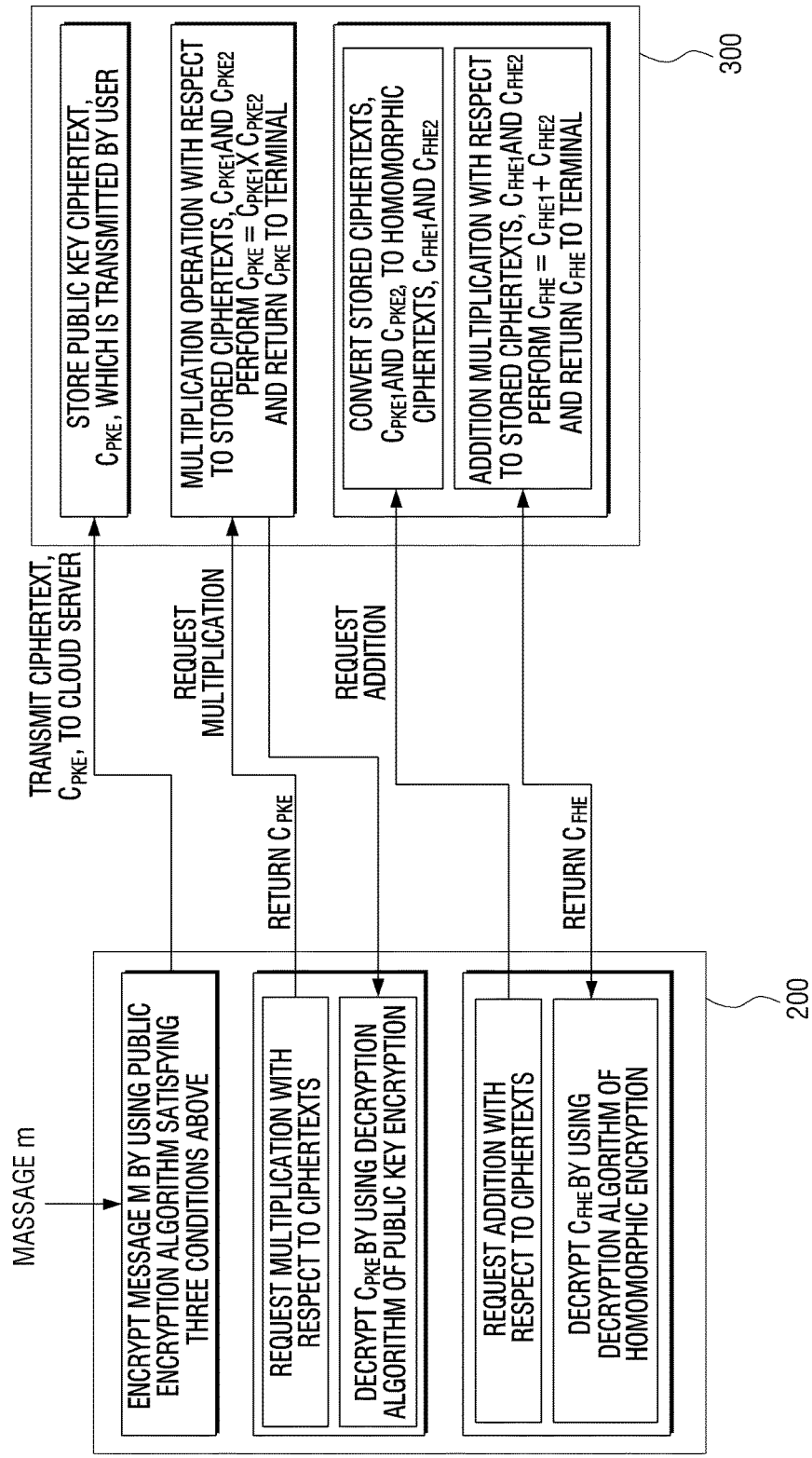
FIG. 7 is a view illustrating a structure of a data management device according to one or more embodiments.

FIG. 7 is a view illustrating a structure of a data management system according to one or more embodiments.

Referring to FIG. 7, the data management system according to another exemplary embodiment may include a terminal 200 and a cloud server 300.

The terminal 200 may generate a ciphertext by encrypting a plaintext such as personal information, etc. and may transmit the generated ciphertext to the cloud server 300. The ciphertext generated by above-described method may be a multiplicative homomorphic ciphertext, and the multiplicative homomorphic ciphertext may satisfy the above-described Equation 1.

The terminal 200 may receive as input a command of addition or multiplication between a plurality of ciphertexts from a user and then may deliver the received operation command to the cloud server 300.

The cloud server 300 may perform an operation between the plurality of ciphertexts according to the operation command and may deliver the operation result to the terminal 200.

The terminal 200 which receives the operation result may perform decryption on the operated ciphertext and may provide the decryption result to a user.

FIG. 8 is a view illustrating the comparing the size of a ciphertext according to the conventional method with a ciphertext according to one or more embodiments.

Referring to FIG. 8, it can be understood that the ciphertext according to cypher processing method according to one or more embodiments has far smaller ciphertext size compared with the conventional homomorphic encryption method. When the encryption method according to one or more embodiments is used, a ciphertext having a small size may be generated and used, and then may be applied to a system with small resources such as a smartphone.

Figure 9:
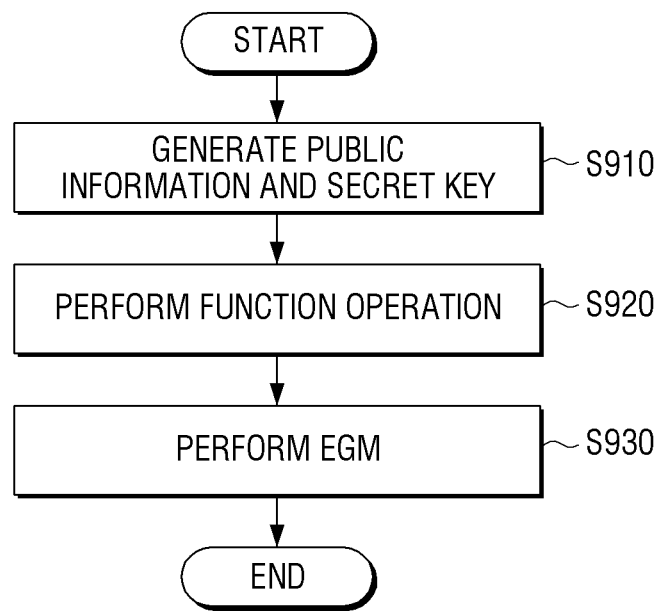
FIG. 9 is a view provided to explain an encryption method according to one or more embodiments.

FIG. 9 is a view provided to explain an encryption method according to one or more embodiments.

Referring to FIG. 9, first, open information and a secret key may be generated (S910). Specifically, a key necessary for encryption based on a public key scheme may be generated.

A function may be performed on a plaintext (S920). Specifically, a function may be performed on a plaintext by using Equation 2, such that a plaintext used in Equation 4 may be ring.

Homomorphic encryption may be performed on the plaintext on which a function may be performed by using a public key (S930). Specifically, homomorphic encryption may be performed on the above plaintext on which a function is performed (i.e., a result where a message space is ring) by using the EGM algorithm as described above. A ciphertext which may outputted by the above described processing may be decrypted by means of a secret key and may be a homomorphic ciphertext which may allow addition and multiplication operation.

As described above, the encryption method according to the present exemplary embodiment may generate a ciphertext which may be smaller in size compared with a ciphertext generated based on the conventional fully homomorphic encryption. As such, a ciphertext having a small size may be generated, and thus the encryption method according to one or more embodiments may be applied to a safe cloud computing where thus-produced ciphertext may be provided. The Encryption method as in FIG. 9 may be realized for a data management device having a configuration of FIG. 1 and a terminal as in FIG. 7. Further, the Encryption method as in FIG. 9 may also be used for a data management device and a terminal having the other configurations.

An encryption method as described above may be realized as a program (or an application) which includes an excutable algorithm that can be executed by a computer, and the above program may be stored in a non-transitory computer readable medium to be provided.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

The foregoing embodiments and advantages are merely exemplary and are not to be construed as limiting the present invention. The present teaching may be readily applied to other types of devices.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An encryption apparatus comprising:
an input receiver configured to receive parameters from an external device; and
a computer processor configured to,
generate a public key necessary for encryption by using the received parameters,
perform a one-to-one function on a plaintext to generate a first portion of a ciphertext in a message space, which allows an addition operation and/or a multiplication operation, by using the Equation below:

$$\iota(m) = (\hat{m}, \check{m}) = \left(m\left(\frac{m}{N}\right), \left(1 - \left(\frac{m}{N}\right)\right)/2\right)$$

wherein the received parameters include N being $p_1 p_2$, $p_1 = 2q_1 + 1$, $p_2 = 4q_2 + 1$, $q_1$ and $q_2$ being prime numbers, m being the plaintext, and (m/N) being a Jacobi symbol, and wherein the computer processor is further configured to further complete generation of the ciphertext using the generated first portion of the ciphertext and the generated public key; and a storage to store the generated ciphertext, wherein the computer processor is further configured to generate a second portion of the ciphertext from the plaintext m by using the Equation below:

$$c = (c_1, c_2, c_3) = (g^{-r}, \hat{m} y^r, \sigma^{\check{m}} h^2)$$

wherein g is an element of $$J_N = \left\{ a \in Z_N^* \mid \left(\frac{a}{N}\right) = 1 \right\}$$

whose order is $$\frac{\phi(N)}{2},$$

y is a value defined to be $y = g^e \mod N$ with respect to a randomly selected $e \in [0, 4q_1 q_2)$, e is a secret key; and wherein the computer processor is further configured to further complete generation of the ciphertext using the generated second portion of the ciphertext.

2. The encryption apparatus as claimed in claim 1, wherein the computer processor is further configured to generate parameters and to generate the public key and the secret key corresponding to the generated parameters.

3. The encryption apparatus as claimed in claim 1, wherein the computer processor performs at least one of the addition operation and the multiplication operation on the stored ciphertext with another stored ciphertext.

4. The apparatus as claimed in claim 3, wherein the computer processor performs decryption on the stored ciphertext.

5. An encryption method, comprising:
receiving parameters from an external device;
generating a public key using the received parameters;
performing a one-to-one function on a plaintext to generate a first portion of a ciphertext, which is able to be added and/or multiplied, by using the Equation below:

$$\iota(m) = (\hat{m}, \check{m}) = \left(m\left(\frac{m}{N}\right), \left(1 - \left(\frac{m}{N}\right)\right)/2\right)$$

wherein the received parameters include N being $p_1 p_2$, $p_1 = 2q_1 + 1$, $p_2 = 4q_2 + 1$, $q_1$, and $q_2$ being prime numbers, m being the plaintext, and (m/N) being a Jacobi symbol;

completing generation of the ciphertext, using the generated first portion of the ciphertext and the generated public key;

storing, in a storage, the generated ciphertext, the encryption method further comprising:
   generating a second portion of the ciphertext from the plaintext m by using the Equation below:

$c=(c_1, c_2, c_3)=(g^{-r}, \hat{m}y^r, \sigma^{\check{m}}h^2)$ where g is an element of $$J_N = \left\{ a \in Z_N^* \,\middle|\, \left(\frac{a}{N}\right) = 1 \right\}$$

whose order is $$\frac{\phi(N)}{2},$$

y is a value defined to be $y=g^e$ mod N with respect to a randomly selected $e \in [0, 4q_1q_2)$, e is a secret key, and wherein generation of the ciphertext is further completed using the generated second portion of the ciphertext.

6. The encryption method as claimed in claim 5, further comprising:
   generating parameters, and
   generating the public key and the secret key corresponding to the generated parameters.

7. The encryption method as claimed in claim 5, further comprising:
   performing at least one of the addition operation and the multiplication operation on the stored ciphertext with another stored ciphertext.

8. The encryption method as claimed in claim 7, further comprising: performing decryption on the stored ciphertext.

9. A non-transitory computer-readable recording medium with computer-executable instructions stored thereon that, when executed by one or more computer processors, cause the one or computer processors to perform an encryption method comprising:
   receiving parameters from an external device;
   generating a public key by using the received parameters;
   performing a one-to-one function on a plaintext to generate a first portion of a ciphertext which is able to be added and/or multiplied by using the Equation below:

$$\iota(m) = (\hat{m}, \check{m}) = \left( m\left(\frac{m}{N}\right), \left(1 - \left(\frac{m}{N}\right)\right) \middle/ 2 \right)$$

wherein the received parameters include N being $p_1p_2$, $p_1=2q_1+1$, $p_2=4q_2+1$, $q_1$, and $q_2$ being prime numbers, m being the plaintext, and (m/N) being a Jacobi symbol;
   the generating of the ciphertext is completed by using the generated first portion of the ciphertext and the generated public key; and
   storing, in a storage, the generated ciphertext,
   the encryption method further comprising:
      generating a second portion of the ciphertext from the plaintext m by using the Equation below:

$c=(c_1, c_2, c_3)=(g^{-r}, \hat{m}y^r, \sigma^{\check{m}}h^2)$ where q is an element of $$J_N = \left\{ a \in Z_N^* \,\middle|\, \left(\frac{a}{N}\right) = 1 \right\}$$

whose order is $$\frac{\phi(N)}{2},$$

y is a value defined to be $y=g^e$ mod N with respect to a randomly selected $e \in [0, 4q_1q_2)$, e is a secret key, and wherein generation of the ciphertext is further completed using the generated second portion of the ciphertext.

* * * * *